US007057522B2

(12) United States Patent
Aab

(10) Patent No.: US 7,057,522 B2
(45) Date of Patent: Jun. 6, 2006

(54) ADJUSTMENT DEVICE AND METHOD FOR ADJUSTING A SEAT WINDOW LIFT OR SLIDING ROOF OF A MOTOR VEHICLE

(75) Inventor: Volker Aab, Sesslach-Heiligersdorf (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 508 days.

(21) Appl. No.: 10/344,626

(22) PCT Filed: Aug. 16, 2001

(86) PCT No.: PCT/DE01/03096

§ 371 (c)(1),
(2), (4) Date: Feb. 14, 2003

(87) PCT Pub. No.: WO02/14111

PCT Pub. Date: Feb. 21, 2002

(65) Prior Publication Data

US 2003/0179081 A1    Sep. 25, 2003

(30) Foreign Application Priority Data

Aug. 16, 2000   (DE)  .............................. 100 39 868

(51) Int. Cl.
*B60R 16/00* (2006.01)

(52) U.S. Cl. .............................. 340/825.69; 340/10.34

(58) Field of Classification Search ........... 340/825.69, 340/825.72, 5.61–5.64, 5.72, 426.16, 426.17, 340/426.36; 341/22, 176; 701/2, 49
See application file for complete search history.

(56) References Cited

U.S. PATENT DOCUMENTS

| 5,515,399 A | 5/1996 | Swart |
| 5,661,651 A | 8/1997 | Geschke et al. |
| 5,804,888 A | 9/1998 | Murr et al. |
| 6,078,252 A | 6/2000 | Kulczycki et al. |
| 6,127,938 A * | 10/2000 | Friedman ................. 340/693.6 |
| 6,163,282 A * | 12/2000 | Mitsuzuka et al. ........... 341/22 |
| 6,285,295 B1 * | 9/2001 | Casden .................. 340/825.22 |
| 6,781,507 B1 * | 8/2004 | Birchfield et al. ......... 340/5.61 |

FOREIGN PATENT DOCUMENTS

| DE | 34 17 956 C2 | 11/1985 |
| DE | 36 28 496 A1 | 2/1988 |

(Continued)

OTHER PUBLICATIONS

IBM Technical Disclosure Bulletin, "Boardless Terminal Keyboard," vol. 32, 10A, Mar. 1990, pp. 82-84.*

(Continued)

*Primary Examiner*—Edwin C. Holloway, III
(74) *Attorney, Agent, or Firm*—Christie, Parker and Hale, LLP

(57) ABSTRACT

The invention relates to an adjustment device, actuated by an external force, for adjusting a seat or a window lift of a motor vehicle. Said device comprises an adjustment drive, a control device for controlling the drive and an operating device for actuating the control device. According to an adjustment method, at least one control signal that is specific to the direction of adjustment is transmitted from the operating device to the control device via a common air interface. The operating device is supplied with power via the common air interface and the adjustment drive can be controlled by the control device using the control signal that has been transmitted via the common air interface.

34 Claims, 3 Drawing Sheets

FOREIGN PATENT DOCUMENTS

| | | |
|---|---|---|
| DE | 198 15 843 A1 | 10/1998 |
| DE | 197 34 749 A1 | 3/1999 |
| DE | 197 38 684 A1 | 3/1999 |
| EP | 0 849 121 A1 | 6/1998 |
| FR | 2 778 980 A1 | 11/1999 |
| WO | WO 96/26527 | 8/1996 |

OTHER PUBLICATIONS

International Search Report of PCT/DE01/03096, dated Mar. 27, 2002.

International Preliminary Examination Report of PCT/DE01/03096, dated Nov. 26, 2002.

* cited by examiner

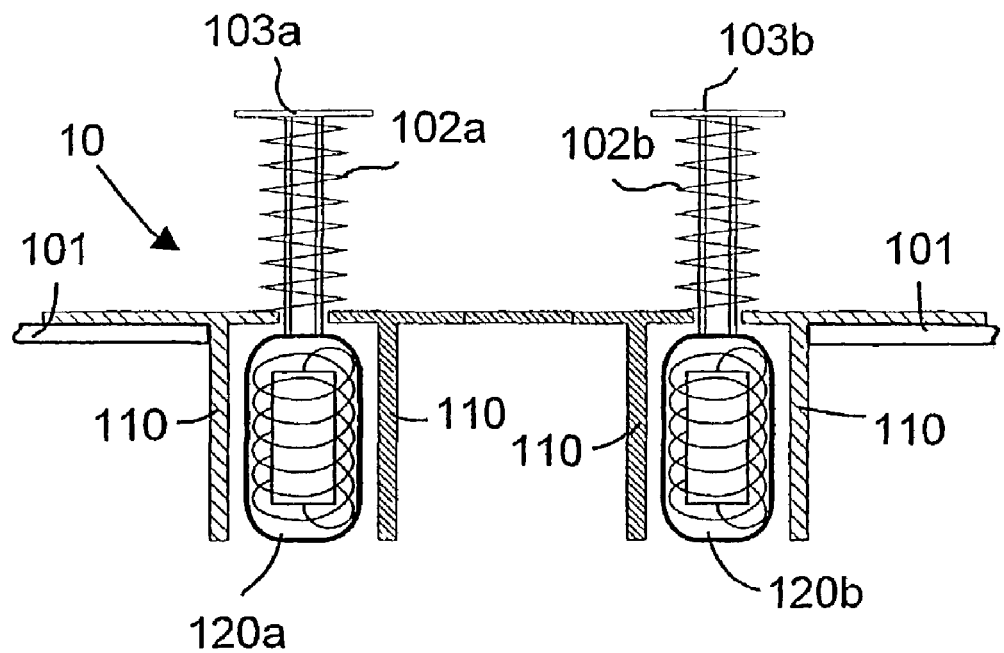
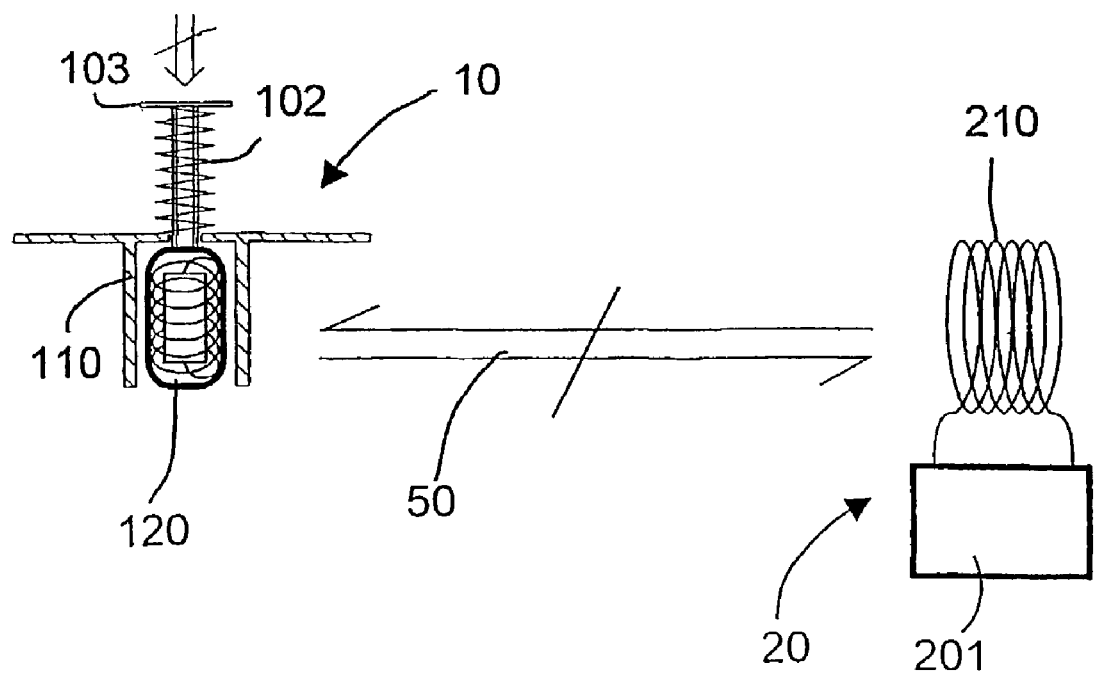

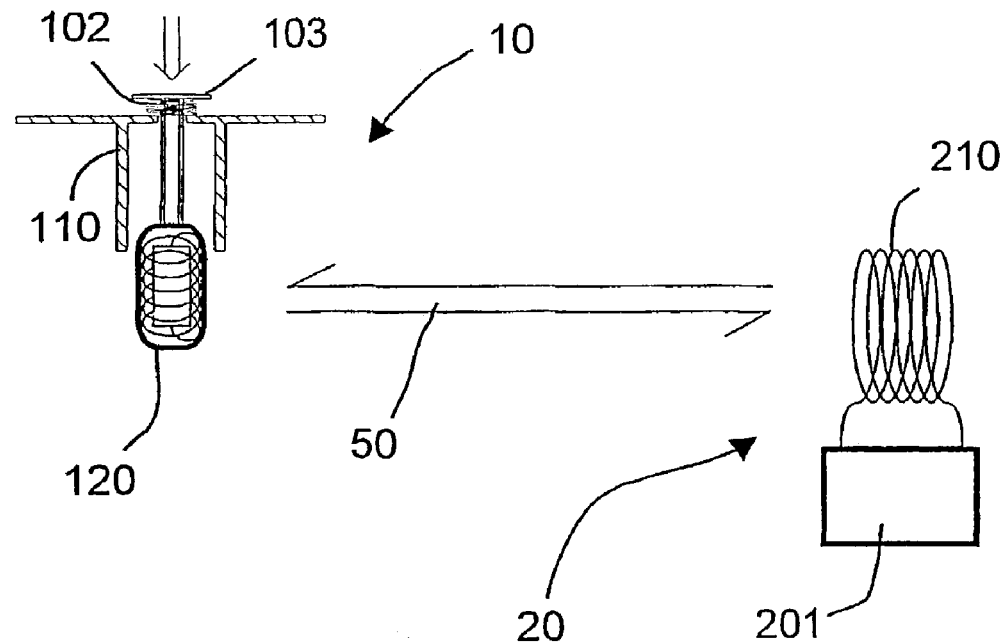
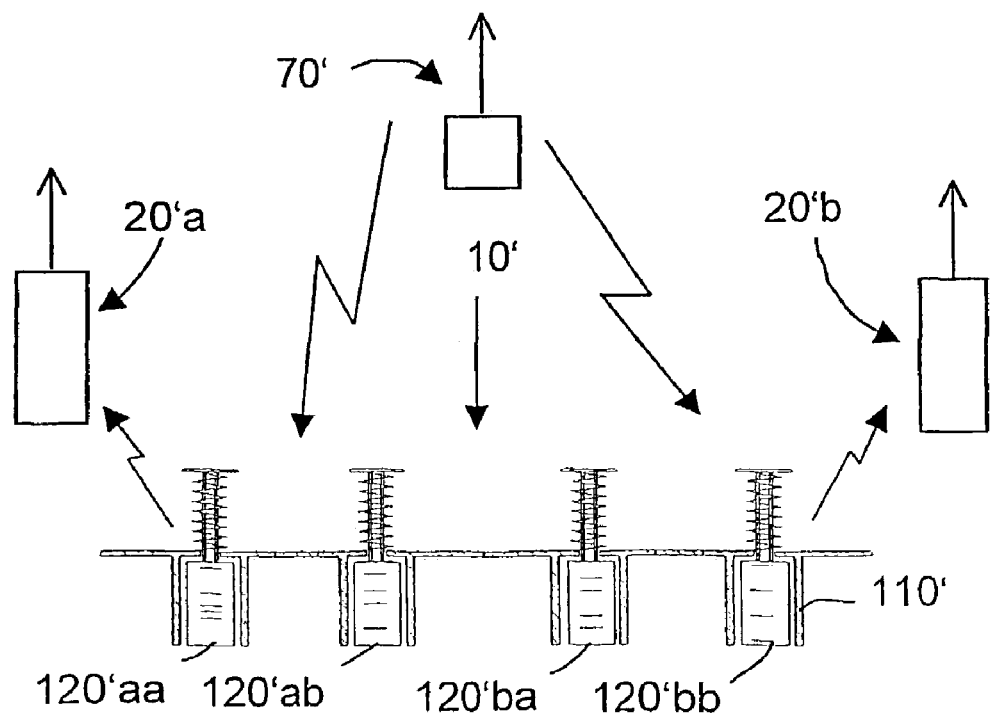

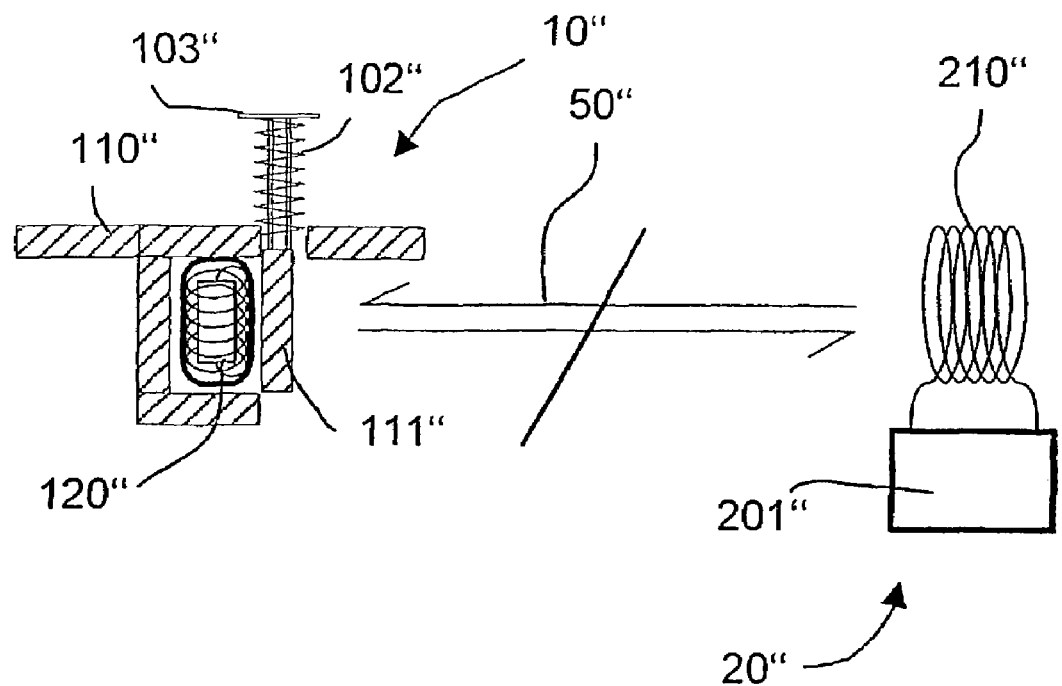
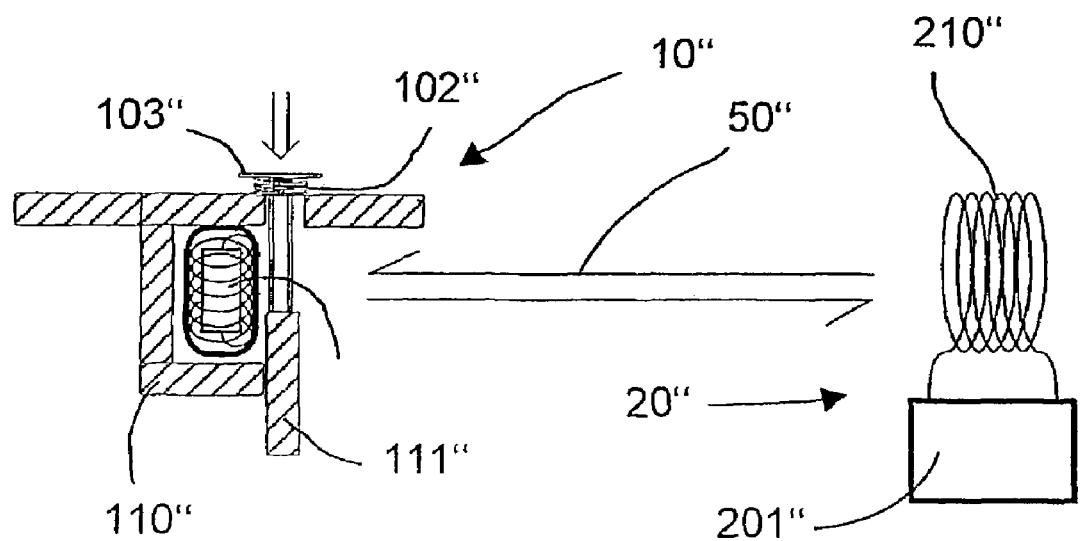

ADJUSTMENT DEVICE AND METHOD FOR ADJUSTING A SEAT WINDOW LIFT OR SLIDING ROOF OF A MOTOR VEHICLE

CROSS-REFERENCE TO RELATED APPLICATION

This application is a National Phase Patent Application of International Application Number PCT/DE01/03096, filed on Aug. 16, 2001, which claims priority of German Patent Application Number 100 39 868.5, filed Aug. 16, 2000.

FIELD OF THE INVENTION

The invention relates to an adjustment device and a method for adjusting a seat or window lift of a motor vehicle through an adjustment device operated by external force.

BACKGROUND OF THE INVENTION

DE 197 38 684 A1 provides a vehicle door which has a window pane and an adjustment device operated by external force for adjusting the window pane. The adjustment device consists of a window lifter with an electromechanical drive, a control electronics unit serving as a control device controlling the drive, and a switch block. The operating device is connected to the control device through an electric lead. All the electrical and electromechanical function units are fixed on a support plate. The support plate serves at the same time to divide the inner space of the door into a wet space and a dry space.

The passenger or vehicle driver can vary the position of the window pane by operating the operating device by pressing a switch or button of the switch block of the operating device. By pressing such a button, operation is transferred to the control device through an electric lead. The control device controls the electro-mechanical drive for adjusting the window pane through a known cable window lift or cross-arm window lift.

If the motor vehicle experiences an accident situation so that, for example, the electric lead is torn or an electric lead or electrical contact is short-circuited through water entering into the motor vehicle, then the control device and drive, which are still technically able to function, cannot be controlled by the passenger or driver operating the operating device. An emergency exit through the window is then not possible without first breaking the window.

From US A 6 078 252 a switch system is known for a vehicle where by operating several switches connected to a transmitter signals are produced through which different devices in the vehicle connected to a receiver can be controlled and adjusted. The switch system requires however a signal-transmitting active operating device which can in the event of breakdown lead to failure of the switch system so that no adjustment of the adjustment device is possible.

From US A 5 804 888 a transponder is known serving as a passive operating device for a theft-warning device for a motor vehicle wherein the portable transponder mounted in the vehicle key contains coded information which is transmitted to a resonance circuit in the lock of the vehicle to tune entry authorisation.

The object of the invention is therefore to provide an adjusting device and method for adjusting the adjusting device which enable the adjustment device to be operated independently of broken electric leads between the operating device and control device.

This is achieved through the method for adjustment having the features of patent claim 1 and an adjustment device operated by external force and having the features of patent claim 24. Further advantageous developments of the invention can be drawn from the sub-claims.

According to this a control signal which is specific to the direction of adjustment for controlling the control device is transferred from the operating device to the control device through an air interface.

For transfer serve a first transfer device of the operating device and a second transfer device of the control device. The first transfer device is mounted on and preferably directly in the operating device. The control device has controllable power switches for sending current to the drive, preferably an electric motor. To supply the drive with power the control device can additionally be connected to energy supply devices, such as corresponding high-powered cables or inductive power coupling elements, for example transformer coils. On the other hand the signals correlating with an operation of the operating device are transferred through the interface. Radio, optical or acoustic transmission systems or further systems which enable a transmission over several centimeters or decimetres are particularly suitable for transmission over the air interface.

The operating device is supplied with energy through the air interface and a screen of the transmission device is changed for sending control signals to the control device in dependence on the manual actuation of the operating device whereby the transmission device is screened at least in one direction of adjustment. The change in the screen of the transmission device can be undertaken in that the transmission device with manual operation of the operating device is moved into a fixed screen or moved out of a fixed screen. As an alternative a movable screen actuated by manual actuation of the operating device can screen off the transmission device or not screen off for transmission of a control signal.

Preferably a transmission device is allocated to each adjustment direction and an operating element of the operating device connected to a transmission device or screen is allocated to each adjustment direction.

In order to determine the direction of adjustment from the control signals, the control signal is characterised according to the direction for example by the control device being able to differentiate between at least two different control signals for the relevant adjustment direction and controlling the power switch accordingly. The characterisation is undertaken through the operating device in that advantageously the characteristic of the control signals is changed manually, mechanically or electrically or a control sign can be switched on and off for the one or other adjustment device.

The operating device is supplied with energy through the air interface. This is possible for example with a receiver circuit of the operating device which is attuned to a transmitting switch circuit. Several transmitting circuits can be arranged decentrally or one central transmitting circuit serves to supply energy to one or more operating devices. Alternatively the first and second transmission device serve in addition to transmitting signals also for supplying energy to the operating device. A pre-requirement for energy supply over a certain distance is however that the operating device only requires a lower current pick-up. The supply to the operating device can be carried out from the relevant associated control device or, if several control devices are controlled by the operating device, a supply is also possible from a central function unit as a function element interacting with the control devices through the air interface.

If the allocation of the control signal is undertaken by the control device, the control device controls the drive at least from the control signal transferred through the air interface in the corresponding direction. In one embodiment of the invention further signals, for example sensor signals or further operating signals are evaluated for control through the control signals.

In a preferred embodiment of the invention the direction of the adjustment is characterised by a direction code in the control signal. The direction code is for example a bit sequence characteristic of the direction or a single bit. In order to increase the security of the transmission the direction code is preferably additionally coded or expanded so that the relevant control device can decode at least the data which is important to it, for example by convoluting with a comparison code similar to the communication of mobile telecommunication systems.

Further means for characterisation are for example the transmission frequency of the transmitted control signals. However it is possible to use all further means for characterisation, such as time window or time slots associated with the control device and within which the control signals are sent. Thus for example a simultaneous multi transmission is produced through the air interface.

In a preferred embodiment of the invention the control signal has time data on activation of the operating device. This time data is preferably in correlation with a duration or type of actuation of the operating device. The control device controls the drive in dependence on this time data for a correlating path stretch of the adjustment or for a correlating time span of the adjustment.

For this the control device evaluates the time data. In the simplest case of evaluation the drive is controlled during the transmission of the control signal. Further complex evaluations enable other types of operation to be detected, for example an automatic run, or the recognition of a defect of an actuating element of the operating device so that the function of the defective actuating element is taken over by another actuating element.

According to an advantageous development of the invention the time data is produced through a code which characterises at least a part of the duration of the actuation. This code is for example contained in the control signal as a bit sequence and sends for example the entire duration of the actuation. The duration of actuation is alternatively divided into several time intervals, for example 100 ms, and for each one time interval a bit sequence is transmitted as code. If the time interval is correspondingly shorter then the bit sequence or another coding is correspondingly adapted. Thus the control of the drive through the control device can take place with only a slight delay from the start of actuation.

According to an alternative development of the invention the time data is a transmission duration which characterises at least a part of a duration of actuation. The transmission duration does not require a continuous transmission of the control signal. As an alternative the control signal is transmitted the next in order in time intervals for an adjustment and the control of the drive is stopped when there is no longer any transmission of a control signal within one time interval.

In a further alternative development of the invention the adjustment drive is controlled at least for the duration of transmission. By way of example the drive can be controlled proportionally in time for the duration of transmission, more particularly the time duration of the control corresponds substantially to the duration of actuation. Further types of operation propose that for example for a certain duration of actuation an automatic run of a window lifter is started. The actuation of the operating device for closing the window pane for a half second for example is detected by the control device as an automatic operating mode and the window pane is moved beyond the transmission duration through the control of the drive until in the closed position.

A further development proposes that the time data consists at least of a start information and end information which characterise the beginning and end respectively of actuation. By way of example the adjustment drive can be controlled between the start information and end information. By reducing the transmission to the start information and end information it is possible to minimise the number of transmissions required.

As an alternative to the developments of the invention mentioned above the time data is determined from an interruption period of the control signal, in that the transmission of the control signal is interrupted at least for the length of actuation of the operating device. Thus particularly advantageously the functional reliability of the operating device and individual actuating elements can be constantly monitored. If for example an actuating element for closing a window pane fails or breaks down then after a monitoring period, thus a period of time in which the control device receives at least a signal for undisturbed operation, the control device recognises the defect of the actuating element. Through this detection the function "close window" can be maintained with the association of a further actuating element for an emergency operating function. By way of example the function "close window" is hereby adopted by the switch position of a rocker switch for the function "raise window" in that the direction of movement is reversed for renewed actuation of the rocker switch for the function "raise window".

As an alternative to the evaluation of the control signals previously described for an operating mode through the control device the operating mode for adjustment is advantageously determined by evaluating a period of actuation of an operating element of the operating device through the operating device. By way of example an automatic operating mode for lowering the window pane is evaluated from the actuation of an operating element beyond one second. Consequently advantageously an operating information on the evaluated operating mode is transmitted from the operating device to the control device, and the control device controls the drive according to the automatic operating mode.

If there is no information on the operating mode the control signal is as an alternative transmitted constantly corresponding to the automatic operation until the window pane is opened. The control signal is here transmitted according to the operating mode and thus for example beyond the actuating period.

According to an embodiment of the invention the control signals are transmitted cyclically, and a number of the transmitted or non-transmitted cycles is evaluated by the control device for adjustment. A cyclic transmission advantageously increases the security of the transmission. If the control data is for example transmitted disturbed then advantageously a minimum number of cycles, for example three cycles, is evaluated in order to verify the validity of the control signal. If for example at least two of the three cycles are detected as properly transmitted control data by the control device the adjustment of the vehicle seat adjustment device is carried out. So as not to have to put up with any great delay one cycle ought to comprise a corresponding short time interval, for example less than 10 ms.

Furthermore it is important that the control device activates an emergency operation particularly in the event of an accident. In emergency operation each control signal transmitted through the air interface is interpreted so that the window pane is opened automatically through the control device. The emergency operation is activated through a crash sensor, the deployment of an airbag, the detection of a fault within a CAN-bus system or through some other initiator.

In addition to the control signals transmitted through the air interface cable-bound operating signals, for example operating signals of the key or lock or CAN-bus-signals are evaluated advantageously by the control device. The control of the operating device is thus undertaken during normal operation also through the cable-bound operating signals. On the other hand in emergency operation the control of the control device is through the control signals via the air interface.

According to a preferred embodiment of the invention the control signal is transmitted through an absorption modulation of a first magnetic alternating field. For this the control device sends the first magnetic alternating field and the quality of a receiving circuit of the operating device is characteristically changed for the absorption modulation for the adjustment. The control device evaluates for control the change in the absorption of the first magnetic alternating field. For such a method transponders supplied with energy by the control device are particularly suitable. Electrical buttons for example are attached to the transponder for actuation.

The transponder coil or transmitter coil mounted in the control device, and the receiver coil of the transponder enable on the one hand the transmission of energy to the transponder. On the other hand the transponder modulates the quality of the receiver stage and thus the energy absorption from the magnetic field of the transmitter of the control device. The absorption modulation is detected in the control device and interpreted as data stream. The buttons thus require neither their own energy supply nor a cable connection between the keyboard and control device. The keyboard can thus be made as a watertight unit and mounted at any point where the magnetic field is disturbed only negligibly for the reliability of the function. In order to prevent mis-use the transponder is identified in the control device.

In addition to transponders there are also all further systems suitable for transmitting the control signals through the air interface as operating device. Advantageously for transmitting the control signal a second electromagnetic radio alternating field independent of a first electromagnetic radio alternating field transmitted to the operating device is transferred from the operating device to the control device. The radio alternating field is for example a continuous signal or particularly advantageously an impulse or burst which is transmitted cyclically or on demand. For such a method interdigital converters which are supplied with energy from the control device are particularly advantageous.

As an alternative operating elements of the operating device are used which generate the energy for sending the control signals from the operating event itself. All energy converters which preferably convert the mechanical energy of the operation into optical, acoustic or electromagnetic signal energy are suitable as such operating elements. These energy converters preferably use the piezo effect for generating an electrical or electromagnetic impulse or a surface wave.

The invention will now be explained in further detail with reference to embodiments illustrated in the drawings in which:

FIG. 1 shows a diagrammatic illustration of an operating device;

FIGS. 2a and 2b show a diagrammatic view of the functioning method of an adjustment device with transponder;

FIG. 3 shows a diagrammatic view of the functioning method of an adjustment device with interdigital converter, and FIGS. 4a and 4b show a further diagrammatic view of the functioning method of an adjuster device with transponder.

FIG. 1 shows diagrammatically an operating device 10. The operating device 10 is fixed as a watertight compact unit in a plastics housing 101. The operating device has two buttons 103a and 103b which are actuated for an opposite direction, for example for opening or closing a vehicle window pane.

The relevant adjustment direction is allocated a transponder 120a and 120b respectively which are fixed on the relevant buttons 103a and 103b respectively. The transponder 120a, 120b is held inside a screen 110 by a spring 102a, 102b.

A transponder 120 is connected through an air interface 50 to a control device 20, as shown by way of example in FIG. 2b. To this end the button 103 is actuated against the spring force of the spring 102. On actuation the transponder 120 is moved out from the screen 110. If the transponder 120 is located screened inside the screen 110, as shown in FIG. 2a, transmission of the control signals is stopped. To transmit the control signals the control device 20 sends through the exciter coil 210 a first magnetic alternating field through the air interface 50 to the transponder 120 which is moved out from the screen 110. The air interface 50, unlike cable-linked interfaces, enables the operating device 10 to be mounted anywhere independent of cables, for example according to the design criteria.

The quality of the receiver circuit of the transponder 120 is changed, for example switched, characteristically for the adjustment direction. By changing the quality, the absorption is modulated through the receiver circuit of the transponder 120 and the control signal is transmitted with the modulation. After demodulation through the evaluation electronics 201 of the control device 20 the control signal is evaluated.

As an alternative and not shown in FIGS. 1 to 2b the transponder 120 is moved for actuation into the screen 110 and the transmission is interrupted. The interruption is evaluated by the evaluation electronics 201 and the adjustment device is controlled.

FIG. 3 shows a variation of the invention. As an alternative to the transponder 120 of FIGS. 2a and 2b interdigital converters 120'aa, 120'ab, 120'ba, 120'bb are used. A transmitter 70' sends bursts or electromagnetic impulses whose frequency are tuned to antennae (not shown in FIG. 3) of the interdigital converters 120'aa, 120'ab, 120'ba, 120'bb. If now an interdigital converter 120'aa, 120'ab, 120'ba, 120'bb is moved out from the screen 110' for actuation the antenna of the interdigital converter 120'aa, 120'ab, 120'ba, 120'bb receives the burst or electromagnetic impulse and generates at least a surface wave which is reflected at the fingers which are characteristic for the interdigital converter 120'aa, 120'ab, 120'ba, 120'bb. The reflected signals are in turn transmitted as electromagnetic waves to the control devices 20'a and 20'b. The characteristically reflected surface waves generate a characteristic impulse sequence which are evaluated by the control devices 20'a and 20'b. A clear association with the actuation for adjustment of the corresponding adjustment device is thereby possible.

Additional design advantages of the invention are achieved through eliminating cables and plugs of the electrical interface of cable-linked systems. Furthermore in particular this design with an electrical interface enables a greater freedom in design when arranging the operating device inside a vehicle door, vehicle seat or in the dashboard.

As an alternative, and not shown in FIG. 3, it is also possible that instead of the transmitter 70' each control device 20'a and 20'b transmits its own burst with a transmission frequency specific for the control device 20'a and 20'b respectively, or the control signals for the two control devices 20' and 20'b are transmitted disjunctively with regard to time.

FIGS. 4a and 4b show an alternative embodiment of the invention. Instead of the transponder 120" a movable screen 111' connected to a button 103" of the operating device 10" is actuated. The movable screen 111" is either displaced or lifted up by operating the button 103" so that the transponder 120" for transmitting the control signal through the air interface 50" at least in the direction of the transmitter coil 210" is not screened.

The solution according to the invention improves the functional reliability and security of the control of the control device through the operating device against outside influences. As opposed to cable-linked systems, systems with an air interface are less sensitive to mechanical influences which can affect an emergency operation of the system particularly in an accident situation. Another advantageous aspect particularly of this design is that compared with cable-linked systems a breakdown of the system through water penetration is reduced in that the operating device is formed as a sealed unit without electrical interfaces.

LIST OF REFERENCE NUMERALS

| | |
|---|---|
| 10, 10', 10" | Operating device |
| 101 | Plastics housing |
| 102, 102", 102a, 102b | Button |
| 103, 103", 103a, 103b | Spring |
| 110, 110' | Screen |
| 111" | Movable screen |
| 120, 120", 120a, 120b | Transponder |
| 120'aa, 120'ab, 120'ba, 120'bb | Interdigital converter |
| 50, 50" | Air interface |
| 20, 20", 20'a, 20'b | Control device |
| 210, 210" | Transmitter coil |
| 201, 201" | Evaluation electronics |
| 70' | Transmitter |

The invention claimed is:

1. A method for adjusting a movable component of a vehicle using at least one adjustment device operated by external force, comprising:
   providing an adjustment drive, a control device that controls the adjustment drive, and an operating device including a transmission device and a screen associated therewith;
   manually actuating the operating device by changing the position of the screen relative to the transmission device to produce at least one characterised control signal associated with an adjustment direction, that is transmitted from the transmission device through an air interface and to the control device and the adjustment drive; and
   supplying the operating device with energy through the air interface.

2. The method according to claim 1, wherein the transmission device is screened at least in one adjustment direction.

3. The method according to claim 1 or 2, wherein the changing includes moving the transmission device with respect to the screen which is in fixed position.

4. The method according to claim 1 or 2, wherein the screen is a movable screen which is moveable by the manual actuation of the operating device relative to the transmission device and the changing includes moving the screen relative to the transmission device.

5. The method according to claim 1, wherein the providing further includes the operating device including a plurality of the transmission devices and each adjustment direction is associated with a corresponding transmission device.

6. The method according to claim 5, wherein the operating device further includes an operating element connected to a transmission device of the plurality of transmission devices, or the screen.

7. The method according to claim 1, wherein the adjustment direction is determined, at least in part, by a direction code in the control signal.

8. The method according to claim 1, wherein the adjustment direction is determined, at least in part, by a transmission frequency of the control signal.

9. The method according to claim 1, wherein the manually actuating further comprises the characterised control signal including time data therein.

10. The method according to claim 9, wherein the characterized control signal is transmitted during a transmission period and the time data is a code or transmission period which characterises at least one part of a period of the actuation.

11. The method according to claim 10, wherein the adjustment drive is controlled at least during the transmission period.

12. The method according to claim 9, wherein the time data includes at least one of start information which characterises a beginning of the manual actuation, and end information which characterises the end of the manual actuation.

13. The method according to claim 9, wherein the transmission of the control signal is interrupted during an interruption period during the manually actuating, and the time data is determined from the interruption period of the control signal.

14. The method according to one of claims 9 to 13, wherein an operating mode for adjusting the adjustment drive is determined from evaluating the time data through the control device.

15. The method according to claim 1, wherein the manually actuating includes actuating an operating element and takes place during an actuation period, and an operating mode for adjusting the adjustment device is determined from an evaluation of the actuation period.

16. The method according to claim 15, wherein operating mode data associated with the operating mode, is transmitted from the operating device to the control device, the control device controls the adjustment drive according to the operating mode data, and the control signal is transmitted according to the operating mode and independently of operating duration.

17. The method according to claim 1, wherein at least one of the control signals is transmitted cyclically, a number of cycles including transmitted cycles and non-transmitted cycles is evaluated by the control device, and an adjustment of the adjustment device is automatically controlled based on a predetermined number of cycles.

18. The method according to claim 17, further comprising evaluating a further predetermined number of cycles to verify the validity of the control signal.

19. The method according to claim 1, wherein the movable component comprises a window pane, and during emergency operation the control device interprets each characterized control signal to automatically open the window pane.

20. The method according to claim 19, further comprising cable-linked operating signals, and controlling the control device using the cable-linked operating signals during normal operation, and during emergency operation, the control device is controlled by the characterized control signals transmitted through the air interface.

21. The method according to claim 1, wherein the control signal is coded with an automatic code.

22. The method according to claim 1, wherein each characterized control signal is transmitted by way of an absorption modulation of a first magnetic alternating field transmitted by the control device, the operating device including a receiver circuit for absorption modulation and in which absorption of the first magnetic alternating field is changed, and the control device evaluates the change of the absorption of the first magnetic alternating field.

23. The method according to claim 1, wherein each characterized control signal is transmitted by a first electromagnetic radio alternating field transmitted from the operating device to the control device, and a second electromagnetic radio alternating field is transmitted to the operating device, the second electromagnetic radio alternating field being independent of the first electromagnetic radio alternating field.

24. An adjustment device operated by external force for adjusting a movable component of a motor vehicle, comprising:
   an adjustment drive,
   a control device that controls the adjustment drive,
   an operating device including a first transmission device and through whose manual actuation the control device is controlled by the operating device, and
   a second transmission device included as part of the control device and for the remote transmission through an air interface of a control signal associated with an adjustment direction and responsive to the manual actuation of the operating device,
   wherein the operating device receives energy supplied through the air interface, and includes a screen that is positionable relative to the first transmission device by manual actuation of the operating device.

25. The adjustment device according to claim 24, wherein the operating device includes at least one button that includes a switching state that can be transferred to the first transmission device.

26. The adjustment device according to claim 24, wherein the operating device includes at least one button that includes a switching state that can be transferred to the screen.

27. The adjustment device according to claim 25 or 26, wherein the first transmission device has, for at least one adjustment direction, a transmission receiver module that is positionable relative to the screen.

28. The adjustment device according to claim 27, wherein the transmission receiver module is moveable relative to the screen.

29. The adjustment device according to claim 27, wherein the transmission receiver module is a transponder.

30. The adjustment device according to claim 27, wherein the transmission receiver module is an inter digital converter with a transmission receiver antenna.

31. The adjustment device according to claim 24, wherein the operating device can be supplied with energy from an energy converter.

32. The method according to claim 3, wherein the changing includes moving the transmission device into a first position screened by the screen from transmitting and out of said first position.

33. The method according to claim 13, wherein the adjustment drive is controlled at least during the interruption period.

34. The adjustment device according to claim 28, wherein the transmission receiver module can be moved into or out of a position whereby transmission is screened by the screen.

* * * * *